June 24, 1930.  A. G. HENRICKS ET AL  1,767,524
STEERING GEAR
Filed April 9, 1926   3 Sheets-Sheet 1

INVENTOR.
Arthur G. Henricks
Holger L. Mitchell
BY
ATTORNEYS

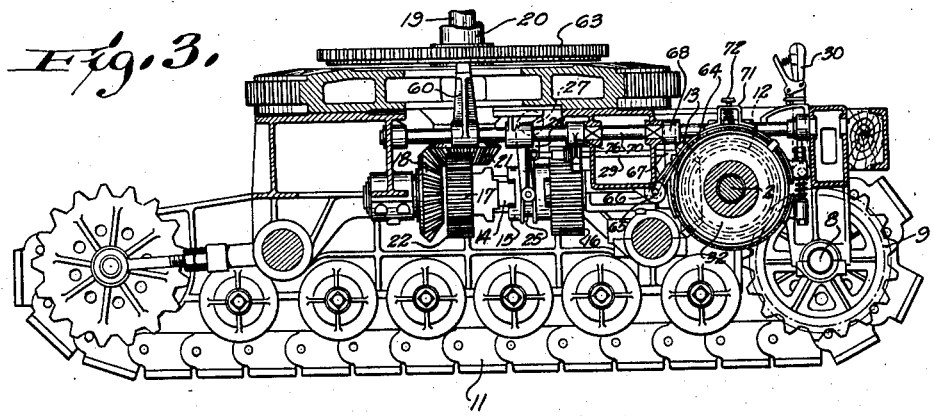

June 24, 1930.  A. G. HENRICKS ET AL  1,767,524

STEERING GEAR

Filed April 9, 1926   3 Sheets-Sheet 3

INVENTOR.
Arthur G. Henricks
Holger L. Mitchell.
BY
ATTORNEYS

Patented June 24, 1930

1,767,524

UNITED STATES PATENT OFFICE

ARTHUR G. HENRICKS AND HOLGER L. MITCHELL, OF MILWAUKEE, WISCONSIN, ASSIGNORS TO HARNISCHFEGER CORPORATION, OF MILWAUKEE, WISCONSIN, A CORPORATION OF WISCONSIN

STEERING GEAR

Application filed April 9, 1926. Serial No. 100,791.

This invention relates to improvements in steering gear and more particularly to steering gear for endless belt tractors such as used for instance for excavator cranes of the so-called full revolving type.

Tractors of the class referred to are provided with suitable clutches for connecting either or both of the traction belts to the main driving shaft for operation thereby, and levers for selectively actuating these clutches whereby the machine may be driven straight ahead by applying both clutches or caused to turn about in either direction by applying either one of the clutches and releasing the other. Due to the comparatively great weight of the various parts and the large area of contact of the traction belts with the ground, it has been found that although the operating clutch for one belt may be released, the latter in some cases will follow along with the other belt, so that the tractor continues along in a straight or nearly straight path. To obviate this difficulty, it has been proposed to provide a brake for each traction belt and levers for actuating these brakes so that when it is desired to turn, the clutch for the inside traction belt may be released and the brake for this belt applied to partly or wholly prevent movement thereof to insure the turning about of the machine upon continued operation of the opposite or outside traction belt. On account of the rotary movement of the upper frame or platform of the machine, upon which are mounted the hoisting mechanism and its associated parts as well as the manually operated steering wheel or equivalent means for the steering gear, it has been necessary to construct or arrange the connecting means between this steering wheel and the respective actuating levers for the clutches and brakes concentric with the vertical axis of rotation of the frame or platform, and to so construct this connecting means that the same will not in any way interfere with the revolving or rotary movement of the upper frame or cause any movement of these clutch and brake actuating levers independently of positive actuation of the steering wheel by the operator. In co-pending application Serial No. 4,800, filed January 26, 1925, such a connecting means between the manually-operated steering wheel and the clutch and brake actuating levers is shown and described, and comprises, in general, a flat, circular member mounted for rotary movement with respect to the tractor frame about the vertical axis of rotation of the upper frame of the machine and provided in its underside with a cam groove receiving the upper ends of the clutch actuating levers and with a second cam groove receiving the upper ends of the brake actuating levers, these grooves being so arranged and shaped as to permit of selective actuation of these clutches and brakes upon rotary movement of this cam member to various predetermined positions whereby both clutches may be applied and both brakes released, both clutches released and both brakes applied, or either clutch applied and the opposite brake partly or wholly applied to cause the machine to travel straight ahead, to stop, or to turn in either direction through arcs of different radii, the manually-operated steering wheel or equivalent means being normally out of operative relation with this cam member and shifted into such relation therewith when it is desired to change the course of the machine or to stop the same. While this construction is entirely satisfactory as regards selectivity of actuation of the clutches and brakes to cause any desired movement of the machine or to completely stop the same, it necessitates the use of the two cam grooves referred to above in the actuating member for the clutch and brake levers, as well as a corresponding increase in the number of parts and a relatively large rotary or angular movement of the cam actuating member in moving from one of its extreme positions to the other.

One of the objects of the present invention, therefore, is to provide an improved steering gear of the type shown and described in the above mentioned copending application and wherein a single actuating lever is used for the clutch and brake associated with each traction belt, and wherein the cam actuating member for these levers is provided with a single cam groove receiving the ends of these levers and being so arranged and shaped as to provide for the same selectivity of control of the clutches and brakes as is found in the construction shown and described in this copending application referred to, the cam actuating member in the present construction, however, having less angular movement in passing from one of its extreme positions to the other than the corresponding cam member found in the aforesaid construction.

Another object is to provide, in steering mechainsm of the character referred to, improved means for moving the clutch parts into and out of engaging relation with each other.

Another object is to provide improved steering mechanism of the character referred to which has advantage over those constructed heretofore as regards selectivity of operation, ease and rapidity of operation, and simplicity of construction.

Other objects and advantages will hereinafter appear.

For the purpose of illustrating the invention an embodiment thereof is shown in the drawings, in which Figure 1 is a plan view, partly in section;

Fig. 3 is a side elevational view partly in section and looking toward the right in Fig. 1, the section being taken on the line 3—3 in Fig. 1;

Fig. 4 is a sectional view, taken on the line 4—4 of Fig. 5;

Fig. 5 is an enlarged sectional view, taken on the line 5—5 of Fig. 1;

Fig. 6 is a side elevational view of one of the parts shown in Figs. 4 and 5;

Fig. 7 is an elevational view, looking toward the left in Fig. 6;

Fig. 8 is a plan view of Fig. 6, projected therefrom at a 45 degree angle with respect to the same;

Fig. 9 is a plan view of one of the parts shown in Figs. 4 and 5;

Fig. 10 is a front elevation of Fig. 9 and

Figures 11 to 15, inclusive, are diagrammatic views in elevation showing the different positions of the cam actuating member and of the cam-way controlled thereby.

Figure 1:
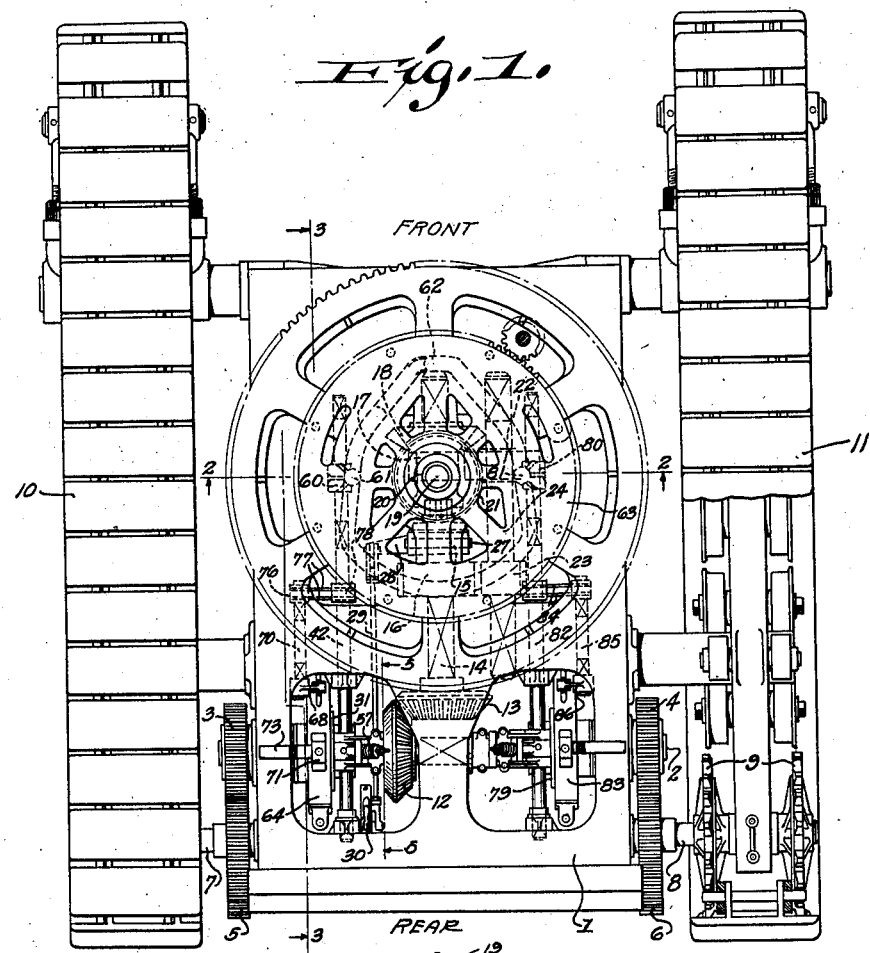
Figure 2:
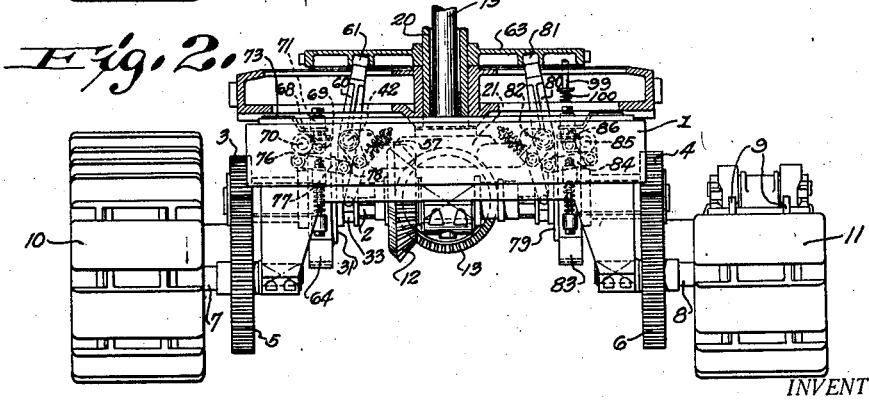
Fig. 2 is a rear end elevation, partly in section, the section being taken on the line 2—2 of Fig. 1.

Referring more particularly to Figs. 1, 2 and 3, the tractor comprises, in general, the frame 1, an axle or drive shaft 2 journaled therein and provided at its outer ends with spur gears 3 and 4 arranged in mesh with similar gears 5 and 6 fixed, respectively, on the shafts 7 and 8 for driving the sprocket wheels 9 operatively connected in the usual manner with the endless traction belts 10 and 11. A beveled gear 12 is fixed on shaft 2 and arranged in mesh with a similar gear 13 fixed on a shaft 14 extending longitudinally of the machine and provided with a clutch member 15 splined thereon and spur gears 16 and 17 loosely fitted on the same, a beveled gear 18 being also loosely fitted on shaft 14 and fixed to gear 17 for rotation therewith. The vertical shaft 19 is connected to and operated by a suitable prime mover (not shown), and extends loosely through the usual gudgeon pin 20 connecting the upper frame or table of the machine to the tractor frame 1 for rotation with respect thereto about a vertical axis, and is provided at its lower end with a beveled gear 21 fixed thereto and arranged in mesh with gear 18. A spur gear 22 is arranged in mesh with gear 17 and another similar gear 23 arranged in mesh with gear 16, gears 22 and 23 being fixed on a shaft 24 extending longitudinally of the machine and thus being parallel to shaft 14, as more clearly shown in Fig. 1.

For the purpose of shifting clutch member 15 into interlocking engagement with gear 16 or gear 17, this member is provided with the usual collar 25 connected to the lower end of an arm 26 pivotally mounted in any suitable manner at 27 and connected through an arm 28 and a rod 29 to a manually-operated lever 30. As indicated in Fig. 1, the pitch diameter of gear 16 is greater than that of gear 22, so that upon shifting of clutch member 15 by means of lever 30 into interlocking engagement with gear 17, the drive shaft 2 will be driven at low speed from shaft 19 through beveled gears 21 and 18, spur gears 17, 22, 23 and 16, and beveled gears 13 and 12, and, further, upon shifting of member 15 into interlocking engagement with gear 16 shaft 2 will be connected to shaft 19 for operation thereby at high speed through beveled gears 21 and 18, shaft 14, and the beveled gears 13 and 12. The transmission mechanism just described, whereby drive shaft 2 may be operated at high or low speeds, forms no direct part of the present improvements, and has only been shown and described with sufficient clearness to enable those skilled in the art to understand the manner in which such mechanism may be embodied in a tractor together with the improved steering gear or mechanism about to be described.

Referring more particularly to Figs. 4 to 10, a clutch 31 is provided for connecting and disconnecting gear 3 to and from shaft 2 and comprises a part 32 mounted loosely on the shaft and fixed to gear 3 for rotation therewith, and a part 33 splined on shaft 2 by means of keys 34 and provided with lugs 35 arranged to interlock with similar lugs 36 with which part 32 is provided, a collar 37 being fixed on shaft 2 and engaging the outer ends of keys 34, as shown, for preventing axial shifting of the same along shaft 2. For the purpose of shifting the clutch part 33 into and out of interlocking or driving engagement with part 32, a member or arm 38 comprising spaced lugs 39 and a collar 40 is fixed by means of a key 41 to a shaft 42 extending longitudinally of the machine and journaled in any suitable manner in frame 1, and complementary parts or members 43 and 44 arranged on either side of member 38 and each comprising a hub or collar 45 loosely fitted on shaft 42 and a downwardly extending arm 46 pivotally connected by a bolt 47 to a suitable ring 48 loosely fitting in an angular groove in the clutch part 33, and inwardly extending lugs 49, members 43 and 44 being provided with registering openings 50 for receiving a bolt 51 or other suitable means for connecting and holding these members in assembled relation with respect to the member or arm 38. The respective adjacent edges of lugs 49 are cut away at 52 so that when members 43 and 44 are fitted together, as shown in Fig. 5, an opening will be provided for loosely receiving a bolt 53 having a head 54 arranged between lugs 39 of arm 38 and pivotally connected thereto by means of a pin 55 extending through registering openings in the lugs and having a press fit therein. Each of the lugs 49 is recessed on its upper side, as more clearly shown in Figs. 7 and 8, to provide, when these lugs are fitted together, a seat 56 for the lower end of a spring 57 arranged on bolt 53 and compressed slightly between seat 56 and a collar 58 loosely fitted on the bolt and held in position thereon by means of nuts 59. From the foregoing it will be seen that upon rotation of shaft 42 in a counter-clockwise direction, as viewed in Fig. 4, lugs 39 of arm 40, which is fixed to shaft 42, will engage the underside of lugs 49 to cause rotation of members 43 and 44 in this direction about the axis of shaft 42, which movement of members 43 and 44 will cause axial movement of clutch part 33 along shaft 2 to the right, as viewed in Fig. 4 whereby the clutch parts are moved out of interlocking or driving relation with each other and the traction belt 10 disconnected from drive shaft 2. Upon reverse rotation of shaft 42, arm 38, by means of its connection with members 43 and 44 through spring 57, will cause similar movement of the latter and consequent movement of clutch part 33 into interlocking or driving relation with clutch part 32, as shown in Fig. 4. In the event that the clutch parts 32 and 33 are moved into engagement with each other when their respective teeth or lugs 35 and 36 are out of mesh, spring 57 will be further compressed between seat 56 and the collar or stop 58 upon continued rotation of arm 38 in a clockwise direction, until the teeth or lugs are again in mesh an instant later, at which time clutch part 33 will snap into interlocking or driving relation with clutch part 32 under the action of spring 57. For the purpose of rotating shaft 42, a lever 60 is fixed thereto and provided at its upper end with a suitable roller 61 which is received by and loosely fits in a cam groove 62 formed in the underside of an actuating member 63 hereinafter more fully explained, member 63 being loosely fitted on gudgeon pin 20 for relative rotary movement with respect to the tractor frame 1 about the axis of shaft 19.

For the purpose of opposing rotation of clutch part 32, a friction brake band 64 is arranged about the latter and fixed at one of its ends by means of a pin 65 extending through spaced lugs 66 which may be formed integrally with frame 1. The other end of band 64 is provided with an arm 67 fixed thereto and having its upper end bifurcated and apertured for receiving the outer end of an arm 68 and a pin 69 or other suitable means for pivotally connecting the latter to arm 67, arm 68 being fixed on a shaft 70 journaled in any suitable manner in the tractor frame 1. An inverted U-shaped bracket 71 is secured to the upper side of band 64 and a bolt 72 passed loosely through this bracket to the outer end of a strap 73 fixed in any suitable manner to frame 1, a nut 74 being threaded upon the end of bolt 72 to hold the same in place, and a spring 75 being arranged on the bolt between bracket 71 and strap 73 and compressed between the latter whereby band 64 is supported by strap 73 through the spring, the latter providing a cushion and allowing for some play between band 64 and the parts supporting the same. A downwardly extending arm 76 is also fixed on shaft 70 and connected by means of links 77 to an arm 78 fixed on shaft 42 and extending downwardly therefrom. In the light of the foregoing description of the construction and arrangement of the various parts connecting clutch 31 and brake 64 with the single actuating lever 60 therefor, it will be seen that upon movement of roller 61 at the upper end of lever 60 to its innermost position, as shown in Fig. 1, clutch 31 will be applied to connect traction belt 10 with the drive shaft or axle 2 for operation thereby and the brake band 64 released from engagement with the clutch part 32, and, further, that upon movement of roller 61 to its extreme outer position to the left, as viewed in Figs. 1 and 2, clutch 31 will be released and brake 64 applied to disconnect the traction belt 10 from shaft 2 and hold the same against movement.

For the purpose of connecting and disconnecting gear 4 to and from drive shaft 2, a clutch 79 is provided, this clutch being identical in construction to clutch 31 and its respective parts described above, and being actuated by means of a lever 80 similar to lever 60 and provided at its upper end with a roller 81 received by and loosely fitting in cam groove 62, lever 80 being fixed on a shaft 82 similar to shaft 42 and extending longitudinally of the machine and being journaled in any suitable manner in the tractor frame 1. The operating connections between shaft 82 and clutch 79 are indicated in the drawings and are identical to the corresponding parts described above for operatively connecting shaft 42 to clutch 31, so that no further explanation of the same is deemed necessary. Clutch 79 is also provided with a brake 83 identical in construction and arrangement to brake 64 and connected to lever 80 for actuation thereby through links 84 similar to links 77, shaft 85 which is similar to shaft 70, and an arm 86 fixed on shaft 85 and being similar to arm 68. It will thus be seen that upon inward movement of roller 81 to its extreme inner position to the left, as viewed in Fig. 1, clutch 79 will be applied and brake 83 released whereby gear 4 and the traction belt 11 are connected to drive shaft 2 for operation thereby, and, further, that upon movement of roller 81 to its extreme position to the right, clutch 79 will be released and brake 83 applied to disconnect the traction belt 11 from shaft 2 and hold this belt against movement.

The construction and arrangement or shape of cam groove 62 in the underside of member 63 and the manner in which it coacts or engages with rollers 61 and 81 at the upper ends of levers 60 and 80, respectively, whereby clutches 31 and 79 and brakes 64 and 83 may be selectively operated to control the machine in the manner explained above, will now be explained, it being remembered in this connection that inward movement of rollers 61 and 81 toward shaft 19 causes application of the clutches and release of the brakes, while the opposite or outward movement of these rollers away from shaft 19 causes release of the clutches and application of the brakes.

Referring more particularly to Figs. 11 to 15, wherein the cam actuating member 63 is shown in four different positions, the points corresponding to the front and rear of the machine are so marked. A pinion 87 is fixed on the lower end of a vertical shaft 88 journaled in any suitable manner in the upper revolvable frame of the machine (not shown) the shaft being provided at its upper end with an operating wheel 89, pinion 87 being arranged in mesh with teeth formed in the outer edge of member 63. This manually-operated means for effecting rotary movement of member 63 to its various positions, as shown, may for instance be made similar in construction to such means as is shown and described in detail in copending application Serial No. 743,706, filed October 15, 1924, the pinion 87 being shiftable out of operative relation with member 63 so that shaft 88 and its associated parts will not rotate upon relative rotary movement of the upper frame of the machine with respect to the tractor frame 1. A suitable stop 90 is arranged in the cam groove 62 at the point indicated and fixed securely to this member by any suitable means such as bolts 91.

Figure 11:
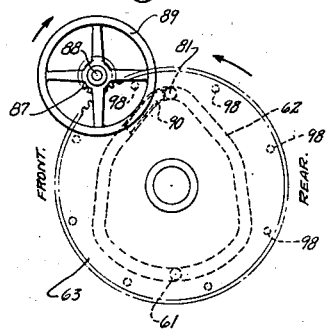
Figure 15:
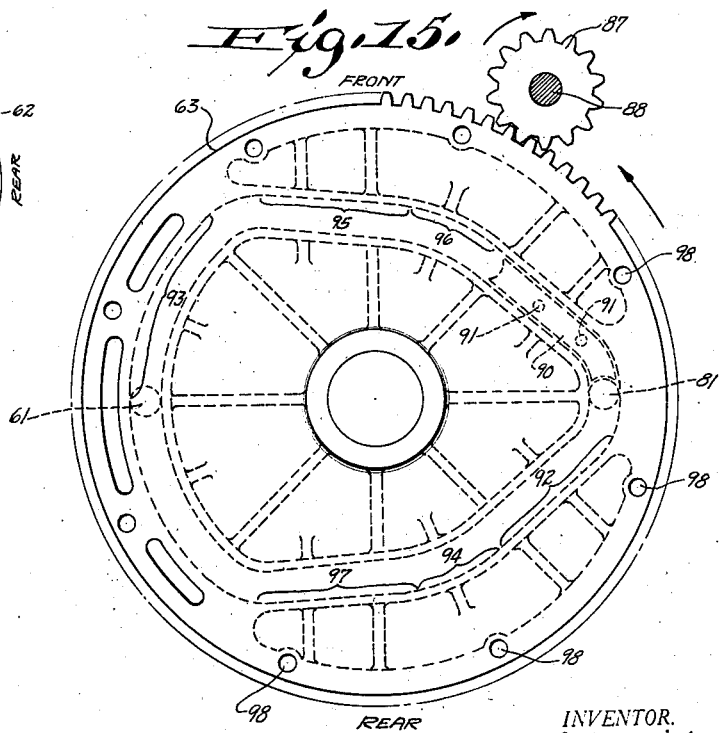

Starting with the position of member 63 as shown in Figs. 11 and 15, stop 90 is shown as engaging roller 81 of lever 80 so that counter-clockwise rotation of wheel 89 to cause clockwise rotation of member 63 is not possible. In this position of member 63, the respective rollers 61 and 81 of levers 60 and 80 are shown in their extreme outer positions, in which positions of these rollers each of the clutches 31 and 79 are released and each of the brakes 64 and 83 applied, whereby both traction belts 10 and 11 are held against movement and the machine held stationary.

Figure 12:
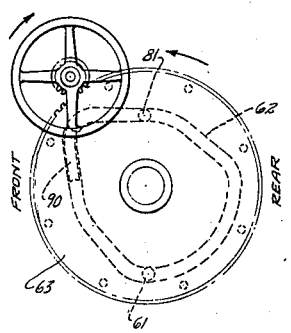

Upon rotation of wheel 89 and consequent rotary movement of member 63 in the directions as shown by the arrows to cause rotary movement of member 63 from the position thereof shown in Figs. 11 and 15 to the position shown in Fig. 12, roller 81 will be caused to traverse the straight portion 92 of slot 62 and roller 61 caused to traverse the portion 93 which is shown as being concentric with the axis of rotation of member 63. It will thus be seen that during this movement of member 63, roller 61 will not be moved, while roller 81 will be moved to its extreme inner position, in which position of roller 81 clutch 79 will be applied and brake 83 associated therewith released whereby the traction belt 11 will be driven and traction belt 10 held against movement to cause the machine to turn sharply to the left, as viewed in Fig. 1. The arrangement of the parts is such that brake 83 is gradually released as roller 81 traverses the first part of the straight portion 92, further inward movement of roller 81 as the same traverses the remaining part of portion 92 causing application of clutch 79, which application of this clutch takes place after brake 83 has been completely released.

Figure 13:
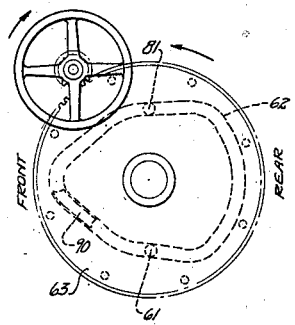
Figure 14:
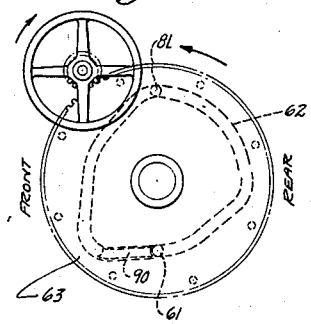

Upon further rotary movement of member 63 from the position thereof shown in Fig. 12 to that shown in Fig. 13, roller 81 will traverse the portion 94 of the cam groove, this portion being concentric with the axis of rotation of member 63. During this movement of member 63, roller 61 will be caused to traverse the straight portion 95 of the cam groove and thus caused to move to its extreme inner position to cause application of clutch 31 and release of brake 64. Since roller 81, during this movement of member 63 to the position thereof shown in Fig. 13 traverses the concentric portion 94 of the cam groove, this roller will remain in its extreme inner position, so that in this position of member 63 both clutches 31 and 79 will be applied and both brakes 64 and 83 released so that both of the traction belts 10 and 11 will be connected to drive shaft 2 and the machine driven straight ahead. The arrangement is such that as roller 61 traverses the first part of portion 95 of the cam groove, brake 64 is gradually released, movement of roller 61 in the remaining part of portion 95 causing application of clutch 31, brake 64 being completely released before clutch 31 is applied. By means of this construction, it will be seen that it is possible to drive the traction belt 11 and to apply brake 64 associated with traction belt 10 varying amounts so that belt 10 may be permitted to follow along more or less with driven belt 11 to cause the machine to turn to the left in arcs of varying radii. During further movement of member 63 from the position thereof shown in Fig. 13 to that shown in Fig. 14, in which position of this member stop 90 engages roller 61 to prevent further movement of this member in the direction of the arrow, roller 61 traverses portion 96 of the cam groove, this portion being concentric with the axis of rotation of member 63 so that during this movement of member 63 no movement of roller 61 takes place. In the position of member 63 as shown in Fig. 14, therefore, clutch 31 is applied and brake 64 released, this adjustment of clutch 31 and brake 64 being the same as in the position of member 63 shown in Fig. 13. During this movement of member 63, roller 81 will traverse the straight portion 97 of cam groove 62 and be caused to move to its extreme outer position to effect release of clutch 79 and application of brake 83, the arrangement being such that as roller 81 traverses the first part of portion 97 brake 83 is released, and as this roller traverses the remaining part of portion 97 clutch 79 will be applied, application of this clutch, however, not taking place until brake 83 has been completely released. It will thus be seen that in the position of member 63, as shown in Fig. 14, clutch 31 is applied to connect the traction belt 10 to drive shaft 2 for operation thereby, and clutch 79 released to disconnect traction belt 11 from the drive shaft and brake 83 applied to hold belt 11 against movement, whereby the machine is caused to turn sharply to the right, as viewed in Fig. 1. After roller 81 has traversed the first part of portion 97 of the cam groove to cause release of clutch 79, member 63 can be further rotated varying amounts to cause different degrees of application of brake 83 to permit traction belt 11 to follow along more or less with the driven belt 10 to cause the machine to turn about to the right in arcs of varying radii.

From the foregoing it will be seen that upon rotary movement of member 63 from one of its extreme positions to the other, as governed by engagement of stop 90 with rollers 61 and 81, which movement is through less than 180 degrees, both brakes 64 and 83 may be released and both clutches 31 and 79 applied to cause the machine to travel straight ahead, both clutches released and both brakes applied to stop the machine, or either clutch applied and its associated brake released and the opposite clutch released and its associated brake applied wholly or in part to cause the machine to turn about in either direction sharply or in arcs of varying radii.

For the purpose of indicating to the operator when member 63 is in its respective positions, as shown in Figs. 11 to 15, this member may be provided on its under side with recesses 98 arranged to receive the upper end of a pin 99 slidably mounted in the tractor frame and urged upwardly by means of a spring 100, these recesses being arranged to receive pin 99 when member 63 is in these various positions, whereby the operator, by his sense of feeling, is informed as to the position of member 63. This indicating means has been more clearly shown and described in the above copending application, Serial No. 4,800, filed January 26, 1925, and has only been shown and described herein in sufficient detail to enable those skilled in the art to understand the manner in which it may be embodied in the present construction.

For the purpose of illustrating the invention a preferred embodiment thereof has been shown and described, but of course various changes may be adopted in the size, shape and arrangement of the parts without departing from the spirit of the invention or the scope of the claims.

The invention claimed is:

1. In steering gear of the character described, the combination with the clutches and brakes thereof, of a lever common to one of said clutches and one of said brakes for actuating the same, a second lever common to the other clutch and brake for actuating the same, a rotary member provided with a cam groove receiving an end of each of said levers and so shaped that the levers are actuated upon rotary movement of said member to various predetermined positions to effect adjustment of said steering gear for straight ahead movement, for turning in either direction, or for stopping.

2. In steering gear of the character described, a frame, a drive shaft supported by and extending transversely of said frame, supporting traction elements arranged on either side of said frame, a clutch and a brake associated with said shaft and one of said elements for opposing movement of the latter or connecting the same to said shaft for operation thereby, a second clutch and a second brake associated with said shaft and the other element for opposing movement of the latter or connecting the same to said shaft for operation thereby, a first and a second shaft extending longitudinally of and supported by said frame for rotary movement, means operatively connecting said first-named clutch and brake to said first shaft, means operatively connecting said second clutch and brake to said second shaft, and means common to and coacting with said first and second shafts for effecting rotary movement thereof to drive or brake both of said elements or to drive one of the latter and brake the other, and actuating means for said last-named means.

3. In a tractor of the class described, a frame, traction belts at either side thereof, a driving axle arranged transversely of said frame for driving said belts, clutches associated with said axle whereby either or both belts may be driven, brakes also associated with said axle for retarding or preventing movement of either or both of said belts, an operating lever common to one of said clutches and one of said brakes, a second operating lever common to the other of said clutches and the other of said brakes, a vertically disposed drive shaft for driving said axle, a disc-like member rotatably associated with said shaft, said member having a cam way formed therein for receiving the free ends of said levers, said cam way being shaped to cause the levers to move in such manner as to selectively actuate the brakes and clutches simultaneously and also independently, and means for rotating said member to thereby actuate said brakes and clutches.

4. In steering gear of the character described, a purality of clutches, a plurality of brakes, actuating members for said clutches and brakes, and a rotary cam member provided with a single substantially concentrically arranged cam way receiving the ends of said actuating members and so shaped as to be adapted upon rotation to so move the actuated members as to cause the clutches and brakes to be selectively operated either simultaneously or independently.

5. In steering gear of the character described, the combination with a tractor having a frame, endless traction belts therefor, a drive shaft, driving connections between said shaft and said belt, said connections being supported by said frame and including clutches for connecting and disconnecting either or both of said belts to and from said shaft, and actuating levers for said clutches, of shaft rotatably supported by said frame and extending longitudinally thereof, brakes for said belts, connections between said last-named shafts and said brakes for operating the latter upon rotary movement of said shafts, means connecting said last-named shafts to said levers for actuation thereby, and a member provided with a cam way receiving the respective ends of said levers and shaped to effect movement thereof and operation of said clutches and brakes upon movement of said member to various positions of adjustment.

6. In a tractor of the class described, a frame, traction belts at either sides thereof, a driving axle arranged transversely of said frame for driving said belts, clutches associated with said axle whereby either or both belts may be driven, brakes also associated with said axle for retarding or preventing movement of either or both of said belts, a pair of operating levers for said brakes and clutches, a vertically disposed drive shaft for driving said axle, a disc-like member rotatably associated with said shaft, said member having a cam way formed therein for receiving the free ends of said levers, and means for rotating said member to thereby actuate said brakes and clutches, said cam way being so formed and arranged that upon rotation of said disc-like member said tractor may be driven either straight ahead, stopped, or turned to the right or to the left through arcs of varying radii.

7. In a tractor of the class described, a frame, traction belts at either side thereof, a driving axle arranged transversely of said frame for driving said belts, clutches associated with said axle whereby either or both belts may be driven, brakes also associated with said axle for retarding or preventing movement of either or both of said belts, a pair of operating levers for said brakes and clutches, a vertically disposed drive shaft for driving said axle, a disc-like member rotatably associated with said shaft, said member having a cam way formed therein for receiving the free ends of said levers, and means for rotating said member to thereby actuate said brakes and clutches, said cam way being arranged substantially concentrically with said drive shaft and being so formed and arranged that upon rotation of said disc-like member said tractor may be either driven straight ahead, stopped, or turned to the right or to the left through arcs of varying radii.

8. In a tractor of the character described, a frame, endless traction belts arranged at either side of said frame, a prime mover supported by said frame, a clutch associated with each of said belts and adapted to connect the same with said prime mover, a brake associated with each of said belts and adapted to retard movement thereof with respect to said frame, members connected to said clutches and said brakes for actuating the same, and a cam member provided with a single groove receiving the ends of said members and adapted to cooperate therewith to effect movement of said clutches and brakes to their respective operative and inoperative positions.

9. In a tractor of the character described a frame, endless traction belts arranged at the sides of the frame, a prime mover supported by said frame, a clutch associating with each belt and operable to connect the same with and disconnect the same from the prime mover, a brake associated with each belt and operable to retard movement thereof, a clutch shaft connected with each clutch for operating the same, a brake shaft connected with each brake for operating the same, connecting means between the shafts for causing the brake shaft to apply its brake when the clutch is released and to release its brake when the clutch is applied, a lever connected to each clutch shaft, and a single cam member having a cam way controlling the levers to simultaneously and independently operate the brakes and clutches.

10. A tractor of the character described including a frame, endless traction belts arranged at the side of the frame, a prime mover supported by the frame, a clutch for each belt operable to connect the same with and disconnect the same from the prime mover, a brake for each belt operable to retard movement of the same, a common operating train for the brake and clutch of each belt, each operating train including a single actuating lever, and a single rotary control cam having a cam-way shaped and designed to receive and co-ordinately actuate said levers to effect engagement of both clutches and release of both brakes, disengagement of both clutches and application of both brakes, or engagement of the clutch of either belt and application of the brake of the opposite belt when the rotary control cam is turned through substantially less than a complete revolution.

11. A tractor of the character described including a frame, endless traction belts arranged at the sides of the frame, a prime mover supported by the frame, a clutch for each belt operable to connect the same with and disconnect the same from the prime mover, a brake for each belt operable to retard movement of the same, an operating train for the brake and clutch of each belt, each operating train having a single actuating lever, and a single rotary control cam having an operating movement of substantially 180° and provided with a cam-way receiving said levers and shaped and designed to co-ordinately actuate said levers to effect engagement of both clutches and release of both brakes, disengagement of both clutches and application of both brakes, or engagement of the clutch of either belt and application of the brake of the opposite belt when the rotary control cam is turned through approximately 180°

In witness whereof we hereto affix our signatures.

ARTHUR G. HENRICKS.
HOLGER L. MITCHELL.